(12) United States Patent
Wang et al.

(10) Patent No.: US 9,000,250 B1
(45) Date of Patent: Apr. 7, 2015

(54) METHODS OF CAPTURING AND IMMOBILIZING RADIOACTIVE NUCLEI WITH METAL FLUORITE-BASED INORGANIC MATERIALS

(75) Inventors: Yifeng Wang, Albuquerque, NM (US); Andy Miller, Albuquerque, NM (US); Charles R. Bryan, Albuquerque, NM (US); Jessica Nicole Kruichar, Albuquerque, NM (US)

(73) Assignee: Sandia Corporation, Albuquerque (MX)

( * ) Notice: Subject to any disclaimer, the term of this patent is extended or adjusted under 35 U.S.C. 154(b) by 867 days.

(21) Appl. No.: 13/225,149

(22) Filed: Sep. 2, 2011

(51) Int. Cl.
*G21F 9/16* (2006.01)
*G21F 9/12* (2006.01)

(52) U.S. Cl.
CPC ..................... *G21F 9/12* (2013.01)

(58) Field of Classification Search
USPC .................................. 588/15, 315, 412, 900
See application file for complete search history.

(56) References Cited

U.S. PATENT DOCUMENTS 7,238,288 B1 7/2007 Gao et al.

*Primary Examiner* — Edward Johnson
(74) *Attorney, Agent, or Firm* — Daniel J. Jenkins

(57) ABSTRACT

Methods of capturing and immobilizing radioactive nuclei with metal fluorite-based inorganic materials are described. For example, a method of capturing and immobilizing radioactive nuclei includes flowing a gas stream through an exhaust apparatus. The exhaust apparatus includes a metal fluorite-based inorganic material. The gas stream includes a radioactive species. The radioactive species is removed from the gas stream by adsorbing the radioactive species to the metal fluorite-based inorganic material of the exhaust apparatus.

7 Claims, 6 Drawing Sheets

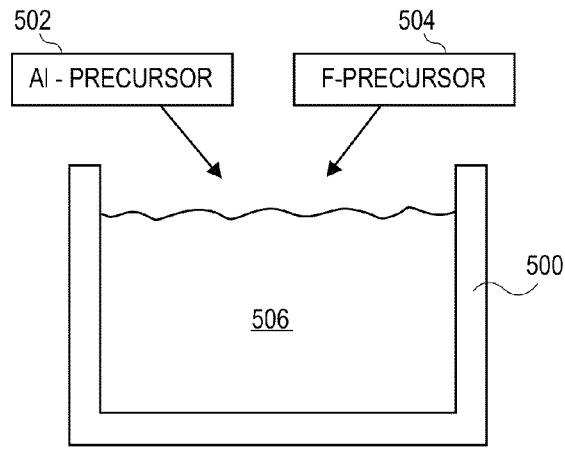
FIG. 5A
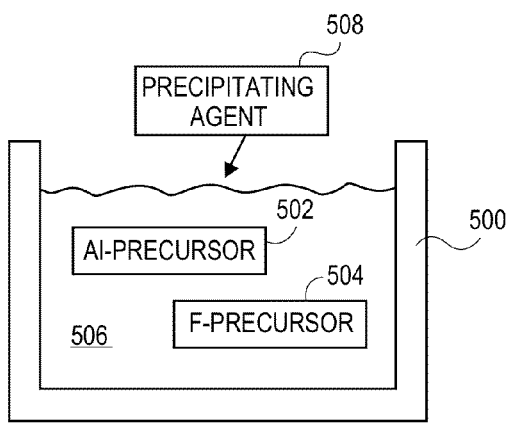
FIG. 5B
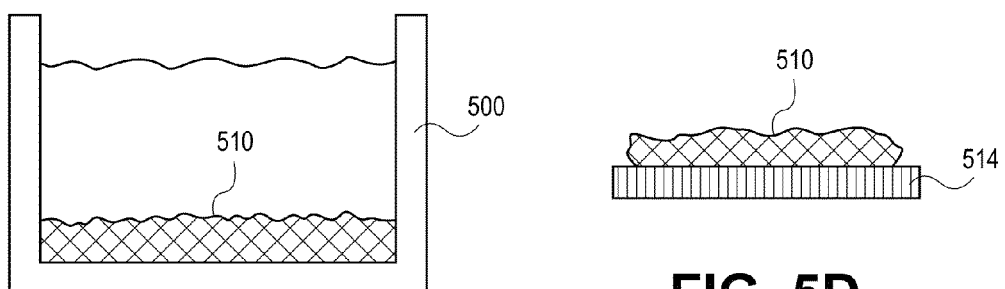
FIG. 5C
FIG. 5D

TABLE 600

|  | EtOH, Room Temp., No polymer | EtOH, Room Temp. | EtOH, Boiling | 70:30 EtOH:H$_2$O, Room Temp. | 70:30 EtOH:H$_2$O, Boiling |
|---|---|---|---|---|---|
| Al:F = 1:1 | Product 6 | Product 7 | Product 8 |  |  |
| Al:F = 1:3 |  | Product 9 | Product 10 | Product 11 | Product 12 |

FIG. 6A

TABLE 602

|  | BET Surface Area, m$^2$/g | I$_2$ sorbed per unit mass, ppm I$_2$/g material |
|---|---|---|
| Product 1 | 27.0254 | 17,521 |
| Product 2 | 39.8269 | 10,462 |
| Product 3 | 5.0041 | 49,311 |
| Product 4 | 6.2576 | 10,291 |
| Product 5 | 50.1992 | 3663 |
| Product 6 | 6.3887 | 41,625 |
| Product 7 | 26.2206 | 28,906 |
| Product 8 | 32.1665 | 33,073 |
| Product 9 | 11.8517 | 36,970 |
| Product 10 | 11.8980 | 46,386 |
| Product 11 | 12.5590 | 29,815 |
| Product 12 | 9.8392 | 25,697 |
| CaF$_2$ (reference) | 0.1903 | 29,585 |

FIG. 6B methods of capturing and immobilizing radioactive nuclei with metal fluorite-based inorganic materials

STATEMENT REGARDING FEDERALLY SPONSORED RESEARCH OR DEVELOPMENT

This invention was developed under Contract DE-AC04-94AL85000 between Sandia Corporation and the U.S. Department of Energy. The U.S. Government has certain rights in this invention.

TECHNICAL FIELD

Embodiments of the present invention are in the field of radioactive nuclei capture and immobilization, and, more particularly, relate to methods of capturing and immobilizing radioactive nuclei with metal fluorite-based inorganic materials.

BACKGROUND

One of the great concerns in the nuclear power field throughout the world is the safe disposal and isolation of used fuels from reactors or waste streams from reprocessing plants. In particular, entrapment of highly mobile radionuclides such as iodine ($^{129}$I) and technetium ($^{99}$Tc) produced from a fission process and subsequent capturing and immobilization of these radionuclides in an appropriate waste form is a great technical challenge because of the high mobility of these radionuclides and the difficulty in incorporating them into any existing waste forms such as glass, ceramics, and grout. Iodine ($^{129}$I) and technetium ($^{99}$Tc) both have long half-lives and can exist as gaseous or anionic species that are highly soluble and poorly sorbed (absorbed or adsorbed) by natural materials. Waste forms are probably the only engineered barrier to limit their release into a human-accessible environment after their disposal. Furthermore, a majority (>99%) of $^{129}$I will enter into the dissolver off-gas stream during fuel reprocessing. It is thus highly desirable to develop a material that can effectively entrap gaseous iodine during the off-gas treatment.

Thus, further advancements are needed in the area of radioactive nuclei capture and immobilization.

SUMMARY

Embodiments include methods of capturing and immobilizing radioactive nuclei with metal fluorite-based inorganic materials.

In an embodiment, a method of capturing and immobilizing radioactive nuclei includes flowing a gas stream through an exhaust apparatus. The exhaust apparatus includes a metal fluorite-based inorganic material. The gas stream includes a radioactive species. The radioactive species is removed from the gas stream by adsorbing the radioactive species to the metal fluorite-based inorganic material of the exhaust apparatus.

In another embodiment, a method of synthesizing a metal fluorite-based inorganic material includes charging a reaction vessel with a solution having an aluminum precursor and a fluorine precursor. A precipitating agent is added to the solution having the aluminum precursor and the fluorine precursor. An aluminum (Al)-rich fluorite precipitate is then isolated.

In another embodiment, a nanoporous material is composed of a metal fluorite-based inorganic compound having a surface area greater than approximately 1 square meter per gram (m$^2$/g).

BRIEF DESCRIPTION OF THE DRAWINGS

FIG. 5A illustrates a cross-sectional view of a reaction vessel charged with an aluminum precursor and a fluorine precursor for synthesizing a metal fluorite-based inorganic material, corresponding to operation 402 of the flowchart of FIG. 4, in accordance with an embodiment of the present invention.

FIG. 5B illustrates a cross-sectional view of a reaction vessel charged with the aluminum precursor and the fluorine precursor with a precipitating agent added thereto, corresponding to operation 404 of the flowchart of FIG. 4, in accordance with an embodiment of the present invention.

FIG. 5C illustrates a cross-sectional view of a reaction vessel with an aluminum (Al)-rich fluorite precipitate therein, in accordance with an embodiment of the present invention.

FIG. 5D illustrates an isolated aluminum (Al)-rich fluorite precipitate, corresponding to operation 406 of the flowchart of FIG. 4, in accordance with an embodiment of the present invention.

FIG. 6A includes, as a table, a material synthesis matrix for direct precipitation, in accordance with an embodiment of the present invention.

FIG. 6B includes a table of material characterization and sorption testing for synthesized metal fluorite materials, in accordance with an embodiment of the present invention.

DETAILED DESCRIPTION

Figure 1A:
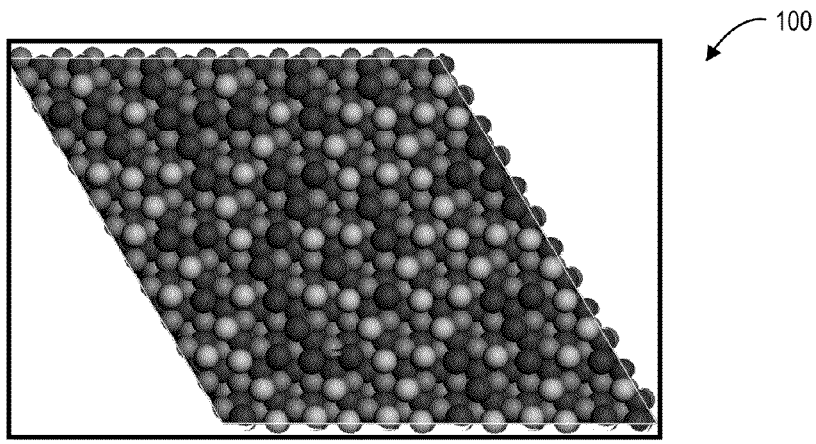
FIG. 1A illustrates a plane view of a 60% fluorinated alumina surface model for use in a Grand Canonical Monte Carlo (GCMC) simulation of iodine gas adsorption, in accordance with an embodiment of the present invention.

Methods of capturing and immobilizing radioactive nuclei with metal fluorite-based inorganic materials are described herein. In the following description, numerous specific details are set forth, such as reagents suitable for aluminum fluorite synthesis, in order to provide a thorough understanding of embodiments of the present invention. It will be apparent to one skilled in the art that embodiments of the present invention may be practiced without these specific details. In other instances, well-known processing operations, such as sample preparation, are not described in detail in order to not unnecessarily obscure embodiments of the present invention. Furthermore, it is to be understood that the various embodiments shown in the figures are illustrative representations and are not necessarily drawn to scale.

Embodiments of the present invention may relate to methods and compositions useful in capture and possible disposal of radionuclides, particularly highly volatile or mobile radionuclides, as well as other hazardous materials. One or more embodiments provide a new set of getter materials and possible waste forms for entrapping or capturing and immobilizing radionuclides, especially $^{129}$I and $^{99}$Tc, as well as other hazardous materials.

High performance inorganic solid adsorbents for capturing gaseous radionuclides may be required in multiple process operations of an advanced fuel cycle. For example, a vented fuel pellet or getter concept has been proposed to extend fuel burn-ups. Such a concept may be intentionally designed to enhance fission gas release from the fuel pellet and to sequester the gaseous fission products in the fuel's plenum using an adsorbent material. In used fuel reprocessing, efforts have been made to develop getter materials for capturing fission gases released from fuel dissolution and oxidation processes. In an embodiment, such materials are also useful for radionuclide containment in an event of nuclear plant accident. Furthermore, in an embodiment, at the backend of the fuel cycle, radionuclide getter materials are also utilized for either long-term geologic waste disposal or interim used fuel storage.

In accordance with an embodiment of the present invention, fluorite-based inorganic solid adsorbents, either natural or synthetic, are used for off-gas treatment. Such adsorbents may perform far better than conventional oxide-based materials with respect to gaseous radionuclide sorption. In one such embodiment, the sorption affinity of fluorite-based inorganic solid adsorbents for gaseous iodine is 2 to 3 orders of magnitude stronger than the conventional oxide-based adsorbents.

Described herein are chemical precipitation and thermal decomposition routes for the synthesis of high surface area nanoporous metal fluorite materials. In an embodiment, the synthesized fluorite materials exhibit excellent iodine sorption capabilities. Furthermore, these materials may have a wide range of applications in advanced nuclear fuel cycles as well as chemical industries. Given their high chemical stability, the adsorbent materials described in embodiments herein may be ideal for use in extreme chemical and physical environments, for example, in acidic elevated temperature environments.

The sorption capability of an adsorbent material may, to a large extent, be determined by the interaction of an adsorbate with the surface terminating atoms of the material. Conventional solid inorganic adsorbents for radionuclide capture are exclusively based on oxide compounds, in which the surface terminating atoms are overwhelmingly oxygen atoms. Using a Grand Canonical Monte Carlo (GCMC) simulation, in accordance with an embodiment of the present invention, we herein describe that replacing (at least conceptually) surface oxygen atoms with fluorine on γ-aluminum oxide significantly improves the capability of the material for iodine sorption (see, e.g., description of FIG. 1B below). Such improvement may be due to the additional polarization of iodine molecules induced by fluorine atoms. The simulation results are consistent with actual experimental data presented below. In an embodiment, based both the simulated and the experimental data, we describe herein that non-oxide materials can be used as adsorbents for gaseous radionuclides, with sorption capabilities significantly improved over conventional oxide-based adsorbents.

Figure 1B:
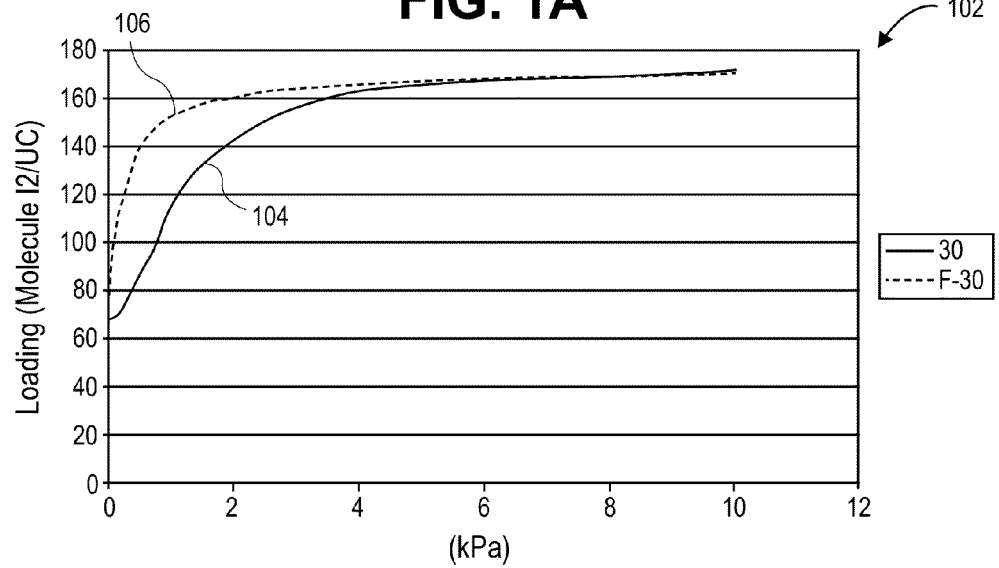
FIG. 1B is a plot of iodine adsorption onto unmodified or fluorinated alumina surfaces predicted from the GCMC simulation, in accordance with an embodiment of the present invention.

FIGS. 1A and 1B depict a Grand Canonical Monte Carlo (GCMC) simulation of iodine gas adsorption on a modified γ-alumina ($Al_2O_3$) surface, in accordance with an embodiment of the present invention. Specifically, FIG. 1A illustrates a plane view of a 60% fluorinated alumina surface model 100 for use in a GCMC simulation of iodine gas adsorption. The balls with the lightest shading represent fluorine (F) atoms, the balls with the darkest shading represent oxygen (O) atoms, and the balls with the intermediate shading represent aluminum (Al) atoms. FIG. 1B is a plot 102 of iodine adsorption onto unmodified (line 104) or fluorinated (line 106) alumina surfaces predicted from the GCMC simulation.

Figure 1C:
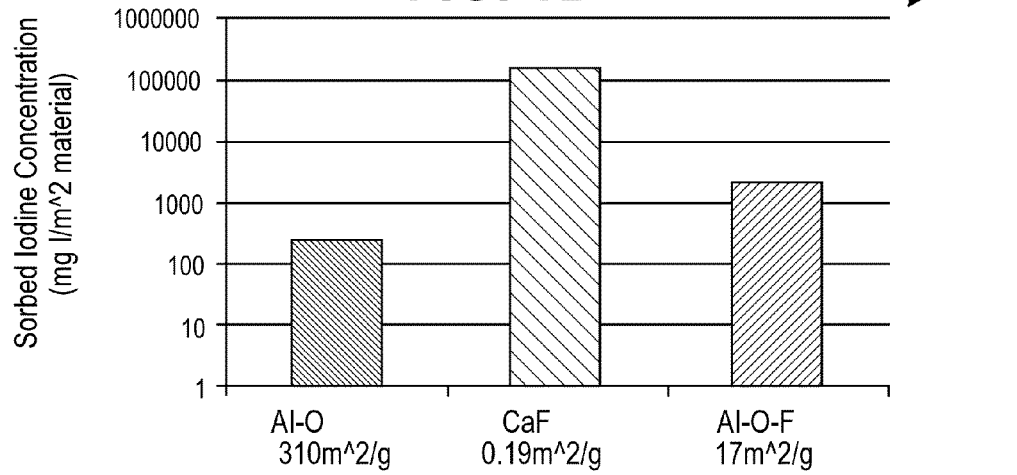
FIG. 1C is a plot showing the measurements of surface normalized iodine sorption capability of metal fluorite or hybrid fluorine/oxygen surfaces in comparison with conventional oxide-based adsorbents, in accordance with an embodiment of the present invention.

As mentioned briefly above, and in accordance with one or more embodiments of the present invention, non-oxide materials (e.g., materials with fluorinated surfaces) show marked improvement versus conventional oxide-based materials with respect to radionuclide sorption. In one such embodiment, the sorption capability of a fluorite material for gaseous iodine (as normalized to surface area) is approximately 1000 times greater than that for conventional oxide materials. As an example, FIG. 1C is a plot 110 showing the measurements of surface normalized iodine sorption capability of metal fluorite (e.g., CaF) or hybrid fluorine/oxygen surfaces (e.g., Al—O—F) in comparison with conventional oxide-based adsorbents (e.g., Al—O), in accordance with an embodiment of the present invention. In consideration of plot 110, in an embodiment, one or both of two phenomena dictate the marked improvement of adsorption: (a) an increased surface area (although surface area is normalized in plot 110) and (b) binding energy (e.g., increased affinity using F-terminating atoms in place of O-terminating atoms).

In an embodiment materials suitable for improved iodine (or other radionuclide) adsorption are synthesized in consideration of one or both of two key factors: (1) the demonstration described herein of high sorption affinity of metal fluorites for iodine-129 (e.g., as shown in plot 110 of FIG. 1C), and (2) techniques described herein for synthesizing high surface area nanoporous materials. In one such embodiment, the combination of both high sorption affinity and high specific surface area renders the resulting nanoporous metal fluorite materials as excellent radionuclide adsorbents.

Figure 2:
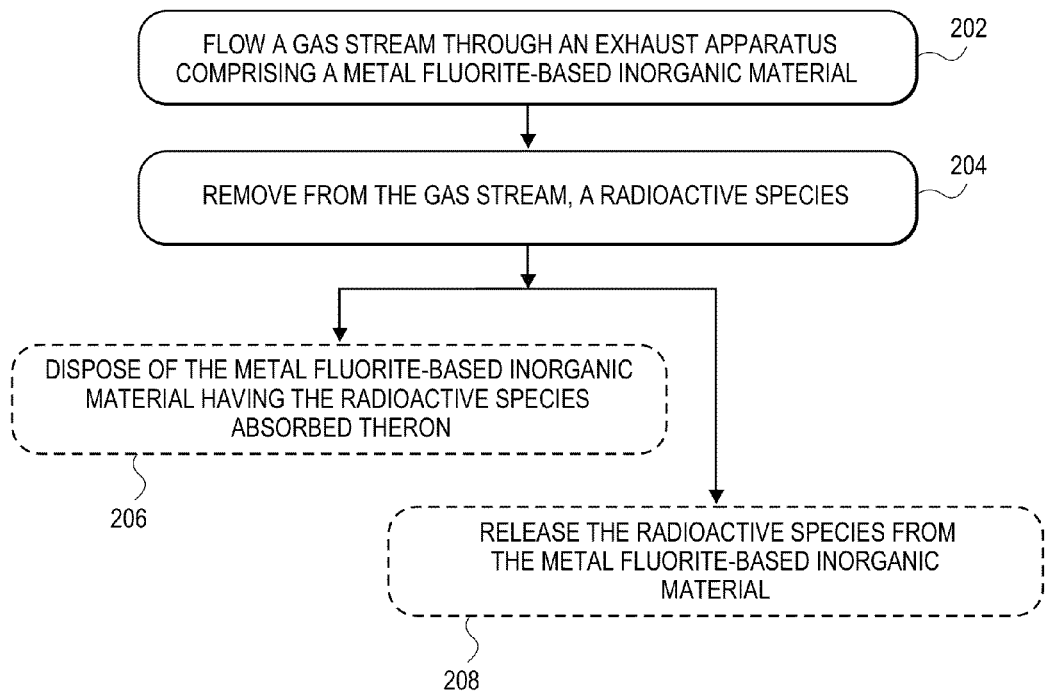
FIG. 2 depicts a flowchart representing an exemplary series of operations in a method of capturing and immobilizing radioactive nuclei with a metal fluorite-based inorganic material, in accordance with an embodiment of the present invention.
Figure 3A:
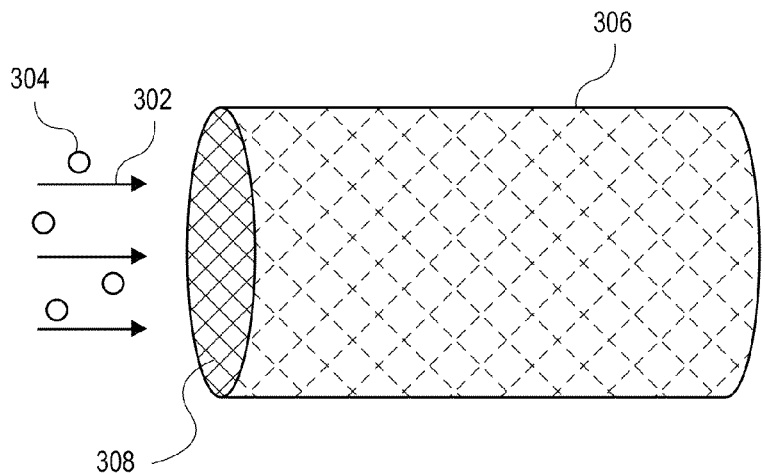
FIG. 3A illustrates a cross-sectional view of a gas stream carrying a radioactive species and entering an exhaust apparatus charged with a metal fluorite-based inorganic material, corresponding to operation 202 of the flowchart of FIG. 2, in accordance with an embodiment of the present invention.
Figure 3B:
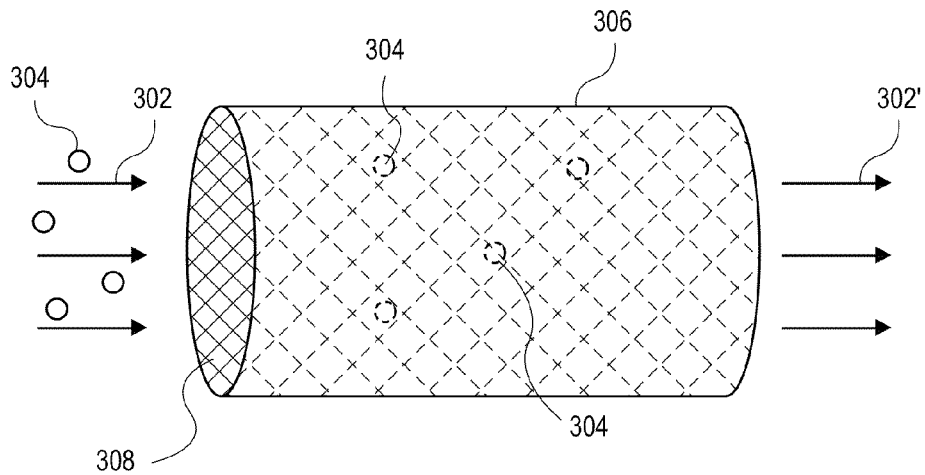
FIG. 3B illustrates a cross-sectional view of the gas stream exiting the exhaust apparatus with the radioactive species adsorbed to the metal fluorite-based inorganic material, corresponding to operation 204 of the flowchart of FIG. 2, in accordance with an embodiment of the present invention.
Figure 3C:
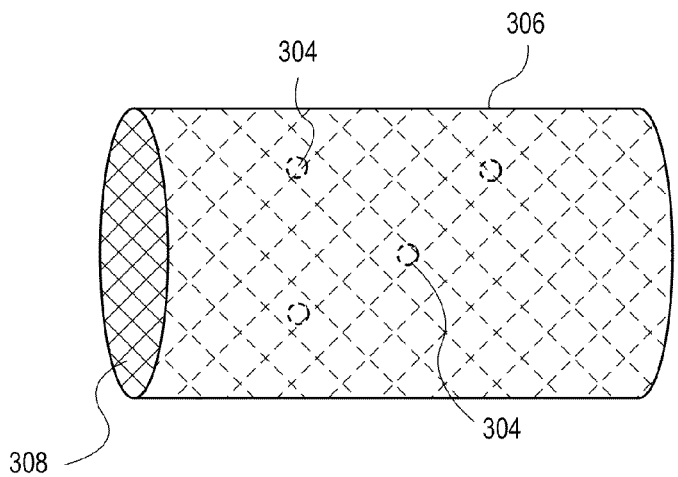
FIG. 3C illustrates a cross-sectional view of the gas stream terminated with the radioactive species still adsorbed to the metal fluorite-based inorganic material, corresponding again to operation 204 of the flowchart of FIG. 2, in accordance with an embodiment of the present invention.

In an aspect of the present invention, radioactive nuclei are captured and immobilized with a fluorite-based material. For example, FIG. 2 depicts a flowchart 200 representing an exemplary series of operations in a method of capturing and immobilizing radioactive nuclei with a metal fluorite-based inorganic material, in accordance with an embodiment of the present invention. FIGS. 3A-3C illustrate schematic representations of various operations of the flowchart of FIG. 2, also in accordance with an embodiment of the present invention.

Referring to operation 202 of flowchart 200, and to corresponding FIG. 3A, a method of capturing and immobilizing radioactive nuclei with a metal fluorite-based inorganic material includes flowing a gas stream through an exhaust apparatus including or charged with a metal fluorite-based inorganic material (either natural or synthetic), the gas stream carrying a radioactive species. In a specific example, a gas stream 302 carrying a radioactive species 304 is flowed through an exhaust apparatus 306 charged with a metal fluorite-based inorganic material 308.

In an embodiment, flowing the gas stream 302 through the exhaust apparatus 306 includes flowing through a nanoporous metal fluorite-based inorganic material (e.g., a nanoporous example of material 308). In an embodiment, flowing the gas stream 302 through the exhaust apparatus 306 includes flowing through a natural or a synthetic aluminum (Al)-rich fluorite (e.g., examples of material 308). In one such embodiment, the flowing is performed through a synthetic aluminum (Al)-rich fluorite with a surface area greater than approximately 1 square meter per gram (m$^2$/g). In an embodiment, a natural fluorite material, such as naturally occurring $CaF_2$, is used.

Referring to operation 204 of flowchart 200, and to corresponding FIG. 3B, the method also includes removing, from the gas stream, the radioactive species by adsorbing the radioactive species to the metal fluorite-based inorganic material of the exhaust apparatus. In a specific example, the gas stream 302' exits the exhaust apparatus 306 with the radioactive species 304 adsorbed to the metal fluorite-based inorganic material 308. In an embodiment, removing the radioactive species 304 from the gas stream 302 includes removing a nuclei such as, but not limited to, $^{129}I$.

Referring to FIG. 3C, the gas stream 302/302' is terminated with the radioactive species 304 still adsorbed to the metal fluorite-based inorganic material 308 in the exhaust apparatus 306. In one such embodiment, referring to optional operation 206 of flowchart 200, the method further includes disposing of the metal fluorite-based inorganic material 308 having the radioactive species 304 adsorbed thereon. In another such embodiment, referring to optional operation 208 of flowchart 200, the method further includes releasing the radioactive species 304 from the metal fluorite-based inorganic material 308. For example, in a specific embodiment, the radioactive species 304 is released from the metal fluorite-based inorganic material 308 into a medium such as, but not limited to, a second gas stream, a liquid extraction medium, or a solid extraction medium for chemical separation or concentration.

Figure 4:
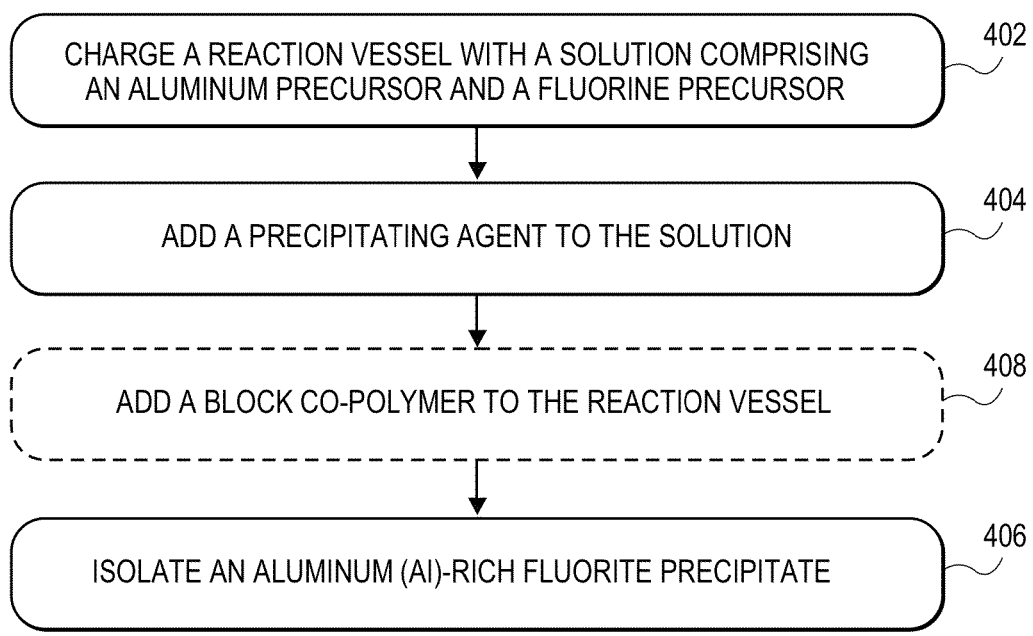
FIG. 4 depicts a flowchart representing an exemplary series of operations in a method of synthesizing a metal fluorite-based inorganic material, in accordance with an embodiment of the present invention.

In an aspect of the present invention, a nanoporous-structured material may be engineered through thermal decomposition or direct precipitation (e.g., by sol-gel methods). For example, FIG. 4 depicts a flowchart 400 representing an exemplary series of operations in a method of synthesizing a metal fluorite-based inorganic material, in accordance with an embodiment of the present invention. FIGS. 5A-5D illustrate schematic representations of various operations of the flowchart of FIG. 4, also in accordance with an embodiment of the present invention.

Referring to operation 402 of flowchart 400, and to corresponding FIG. 5A, a method of synthesizing a metal fluorite-based inorganic material includes charging a reaction vessel with a solution including an aluminum precursor and a fluorine precursor. Specifically, a reaction vessel 500 is charged with an aluminum precursor 502 and a fluorine precursor 504, e.g., in the form of a solution 506.

In an embodiment, charging the reaction vessel 500 with the solution 506 including the aluminum precursor 502 and the fluorine precursor 504 includes charging the reaction vessel 500 with aluminum trichloride ($AlCl_3$) and a trifluoracetate. In one such embodiment, the trifluoracetate is a neutralized product of trifluoracetic acid. In one embodiment, charging the reaction vessel 500 with $AlCl_3$ and the trifluoracetate further includes using a water/ethanol solution 506. In an embodiment, charging the reaction vessel 500 with the solution including the aluminum precursor and the fluorine precursor includes using an aluminum:fluorine molar ratio of approximately 1:1 or 1:3, examples of which are described in more detail below.

Referring to operation 404 of flowchart 400, and to corresponding FIG. 5B, the method also includes adding a precipitating agent to the solution including the aluminum precursor and the fluorine precursor. Specifically, the reaction vessel 500 charged with the aluminum precursor 502 and the fluorine precursor 504 has a precipitating agent 508 added thereto.

In an embodiment, adding the precipitating agent 508 includes adding polyethylene oxide. Upon adding the precipitating agent 508, referring to FIG. 5C, the reaction vessel 500 has an aluminum (Al)-rich fluorite 510 precipitated therein.

Referring to operation 406 of flowchart 400, and to corresponding FIG. 5D, the method also includes isolating an aluminum (Al)-rich fluorite precipitate. Specifically, an isolated aluminum (Al)-rich fluorite precipitate 512 may be collected on a filter 514.

In an embodiment, isolating the Al-rich fluorite precipitate 512 includes collecting the Al-rich fluorite precipitate 510 of FIG. 5C on the filter 514, subsequently washing the Al-rich fluorite precipitate with deionized water, and subsequently heating the Al-rich fluorite precipitate. In one such embodiment, heating the Al-rich fluorite precipitate 510 of FIG. 5C dehydrates the Al-rich fluorite precipitate to provide the isolated aluminum (Al)-rich fluorite precipitate 512.

In an embodiment, referring to optional operation 408 of flowchart 400, the method may also include, prior to adding the precipitating agent 508, adding a block co-polymer to the reaction vessel 500. In one such embodiment, isolating the Al-rich fluorite precipitate 512 includes thermalizing the precipitate 510 of FIG. 5C (which, in this embodiment, would include the block co-polymer encapsulated therein) to remove the block co-polymer. In an embodiment, the block co-polymer is used to fabricate porosity (and hence increased surface area) into a synthetic metal fluorite-based inorganic material. In a specific embodiment, the block co-polymer is a material such as, but not limited to poly(ethylene glycol)-block-poly(propylene glycol)-block-poly(ethylene glycol), known commercially as P123.

As mentioned briefly above, thermal decomposition may be used as part of the fabrication or synthesis of a nanoporous aluminum fluorite material. In an embodiment, such a process is based on the initial precipitation of an Al—$OOCCF_3$ precursor (e.g., may be the precipitate 510 of FIG. 5C) disposed around an organic polymer framework, e.g., such as a block co-polymer framework. In one such embodiment, the precursor is decomposed at approximately 350° C. Subsequently, the polymer is removed via calcination at approximately 550° C. The end result may be to leave behind a fluoride rich, high surface area Al-based precipitate.

In specific set of experimental embodiments, solutions for Products 1-5 below were all prepared on a hot plate set at approximately 60° C. with constant stirring. Approximately 12 grams of a block co-polymer was dissolved in approximately 72 milliliters of ethanol (EtOH) (Solution 1) to provide a nanoporous template. Approximately 34 grams of aluminum trichloride ($AlCl_3$) was dissolved in approximately 45 milliliters of 1:1 EtOH:$H_2O$ solution (Solution 2). Solution 2 was added to Solution 1 to provide a mixed Solution 3. Approximately 40 grams of polyethylene oxide (PO) was added to Solution 3. The precipitate was aged in an approximately 70-90° C. oven overnight, or longer as necessary for solvent removal.

To the above basic operations, trifluoroacetic acid (3FAc) was added to provide a stoichiometric ratio of Al:F of approximately 1:3, and was added at various stages and in various forms to provide Products 1-5. Product 1: un-neutralized 3FAc was added to Solution 1. Product 2: neutralized 3FAc (with a pH of approximately 5) was added to Solution 1. Product 3: neutralized 3FAc was added to Solution 3. Product 4: neutralized 3FAc was added to Solution 2 (with an immediate precipitation operation and no other operations following). Product 5: identical to Product 2, but the PO was not added, and the precipitation proceeded via solvent evaporation in an oven. Once synthesized, all Products 1-5 were subjected to heating in a muffle furnace for approximately 2 hours at approximately 350° C., then for approximately 2 hours at approximately 600° C.

As also mentioned briefly above, direct precipitation may be used as part of the fabrication or synthesis of a nanoporous aluminum fluorite material. In an embodiment, direct precipitation is based on making an Al—F precursor solution, followed by precipitation of an Al—F rich complex. The precipitation results from solvent insolubility with and without a polymer framework.

In specific set of experimental embodiments, precursor solutions for Products 6-12 below were all prepared by dissolving approximately 50 grams of $AlCl_3$ in an approximately 70:30 EtOH:$H_2O$ mixture (e.g., approximately 100 milliliters) and heated to near boiling. Either approximately 8 grams (Al:F=1:1), or approximately 35 grams (Al:F=1:3) of sodium fluoride (NaF) was dissolved in water (e.g., approximately 200 milliliters) and a sufficient amount of concentrated hydrochloric acid (HCl) to provide a pH less than approximately 2. In both cases, a slurry was created. The NaF slurry was then combined with the $AlCl_3$ solution. The entire solution was then brought to a boil. Upon clarification of the solution, the solution was reduced in volume until precipitates began to form. A relatively small amount of water was added to re-dissolve the precipitates. The resulting parent solution was poured into various mixtures of EtOH and $H_2O$. In all but one of the above mixtures, approximately 16 grams of block co-polymer had been added. The above process provided Products 6-12 listed in table 600 of FIG. 6A (table 600 is a material synthesis matrix for direct precipitation). All precipitates were then collected through solvent evaporation, dried in an approximately 90° C. oven overnight and subsequently calcined at approximately 600° C. for approximately 4 hours.

FIG. 6B includes a table 602 of material characterization and sorption testing for Products 1-12 (synthesized metal fluorite materials) from above, in accordance with an embodiment of the present invention. Referring to table 602, all samples were characterized using BET surface area measurements (S. Brunauer, P. H. Emmett, and E. Teller, *J. Am. Chem.*, 1938, 60, 309), which is a surface area technique based on monolayer adsorption of nitrogen gas, and gaseous iodine sorption studies. Results for a natural $CaF_2$ mineral are also provided as a point of reference.

These results tabulated in table 602 exemplify the importance of both the ordering of the operations of the synthesis as well as the solvent choice. In an embodiment, for the thermal decomposition materials (Products 1-5), there is a clear advantage to adding the neutralized 3FAc to the parent Al-polymer solution. Adding the neutralized 3FAc at other points provides significantly impacted results. In another embodiment, for the direct precipitation materials (Products 6-12), there is a clear advantage to using pure ethanol to precipitate the materials. For example, Products 6, 8, 9, and 10 all perform better than the $CaF_2$ reference material, which is a natural $CaF_2$, and all were prepared in ethanol. Other variables (such as, but not limited to, presence of polymer, stoichiometric ratios, temperature) play only a secondary role. It appears that the addition of fluorine in the various synthesis procedures increases the chemical affinity of iodine to the surface of the resulting synthetic compound. Despite the lower surface areas relative to the Al-O material, the fluorinated compounds still outperform existing oxide-based adsorbents in total iodine removal.

As mentioned above, the high performance inorganic solid adsorbents described herein may be applied to capturing gaseous radionuclides in multiple process operations of an advanced fuel cycle from novel fuel concepts, to off-gas treatment of used fuel reprocessing, and to nuclear waste disposal. The applications may potentially be extended to the capture, separation, and immobilization of non-radioactive chemicals. Given their high chemical stability, the adsorbent materials described herein can, in an embodiment, be ideal for use in extreme chemical and physical environments, for example, in acidic elevated temperature environments.

Although a variety of surface areas may be fabricated for an aluminum-rich fluorite species and may be suitable for radionuclide capture, investigations thus far indicate that the greater the surface area, the greater the immobilization ability. In an embodiment, a nanoporous material is composed of a metal fluorite-based inorganic compound having a surface area greater than approximately 1 square meter per gram ($m^2$/g). In one such embodiment, the metal fluorite-based inorganic compound is an aluminum (Al)-rich fluorite species. In another such embodiment, the surface area is greater than approximately 5 square meters per gram ($m^2$/g). In yet another such embodiment, the surface area is approximately in the range of 5-100 square meters per gram ($m^2$/g).

Embodiments of the present invention may be based on the capture and encapsulation of radionuclides, particularly highly mobile radionuclides, including radioactive isotopes of iodine and technecium. For example, in one embodiment, methods described herein are used to render hazardous materials less dangerous. Embodiments may also include generating getter materials and the resultant waste forms, and compositions of matter of the getter materials and the resultant waste forms.

Overall, then, metal fluorite inorganic materials, such as nanoporous aluminum fluorite, represent a class of highly efficient materials for uptake of gaseous iodine (and other volatile radionuclides) even at an elevated temperature. Such materials may, in an embodiment, be converted to a durable waste form in which the sorbed iodine is effectively encapsulated. The technology of the invention may be applied to the treatment of other radionuclides and even non-radioactive hazardous materials. Other radionuclides for which the present invention may be useful include, but are not limited to, iodine (including $^{129}I$) (both in gaseous and anionic forms such as $I^-$ and $IO_3^-$), technetium (including $^{99}Tc$) (e.g., in anionic forms such as $TcO_4^-$), and radioactive isotopes of Pu, Am, U, Th, Np, Se, Cs, Sr, C, Cl, H, Xe and Kr in the forms of molecular species, cations and anions. Non-radioactive hazardous materials that may be disposed of according to one or more embodiments of the invention include heavy metals such as Pb and Cd in the form of cations. It is to be understood that metal fluorite species suitable for capturing and immobilizing such ions may include metal fluorite species other than the aluminum rich versions described in details herein; and they may, in one or more embodiments, include the fluorite compounds of alkaline earth metals (e.g., Ca), transition metals (e.g., Mn, Zr, Re), or rare earth metals.

Thus, methods of capturing and immobilizing radioactive nuclei with metal fluorite-based inorganic materials have been disclosed. In accordance with an embodiment of the present invention, a method of capturing and immobilizing radioactive nuclei includes flowing a gas stream through an exhaust apparatus. The exhaust apparatus includes a metal fluorite-based inorganic material. The gas stream includes a radioactive species. The radioactive species is removed from the gas stream by adsorbing the radioactive species to the metal fluorite-based inorganic material of the exhaust apparatus. In one embodiment, the method further includes disposing of the metal fluorite-based inorganic material having the radioactive species adsorbed thereon. In one embodiment, the method further includes releasing the radioactive species from the metal fluorite-based inorganic material into a medium such as, but not limited to, a second gas stream, a liquid extraction medium, or a solid extraction medium for chemical separation or concentration.

What is claimed is:

1. A method of capturing and immobilizing radioactive nuclei, the method comprising:

flowing a gas stream through an exhaust apparatus comprising a metal fluorite-based inorganic material, the gas stream comprising a radioactive species; and removing, from the gas stream, the radioactive species by adsorbing the radioactive species to the metal fluorite-based inorganic material of the exhaust apparatus.

2. The method of claim 1, further comprising:

disposing of the metal fluorite-based inorganic material having the radioactive species adsorbed thereon.

3. The method of claim 1, further comprising:

releasing the radioactive species from the metal fluorite-based inorganic material into a medium selected from the group consisting of a second gas stream, a liquid extraction medium, and a solid extraction medium for chemical separation or concentration.

4. The method of claim 1, wherein flowing the gas stream through the exhaust apparatus comprises flowing through a nanoporous metal fluorite-based inorganic material.

5. The method of claim 1, wherein flowing the gas stream through the exhaust apparatus comprises flowing through a natural or a synthetic aluminum (Al)-rich fluorite.

6. The method of claim 5, wherein the flowing is performed through a synthetic aluminum (Al)-rich fluorite with a surface area greater than approximately 1 square meter per gram ($m^2/g$).

7. The method of claim 1, wherein removing the radioactive species from the gas stream comprises removing $^{129}I$ nuclei.

* * * * *